United States Patent
Presser et al.

(10) Patent No.: US 12,227,246 B2
(45) Date of Patent: Feb. 18, 2025

(54) METHOD AND PROCESSING STATION FOR CONNECTING COMPONENTS OF A VEHICLE BODY

(71) Applicants: thyssenkrupp Automotive Body Solutions GmbH, Heilbronn (DE); thyssenkrupp AG, Essen (DE)

(72) Inventors: Heiko Presser, Freisen (DE); Dominic Doering, Merchweiler (DE)

(73) Assignees: thyssenkrupp Automotive Body Solutions GmbH, Heilbronn (DE); thyssenkrupp AG, Essen (DE)

( * ) Notice: Subject to any disclaimer, the term of this patent is extended or adjusted under 35 U.S.C. 154(b) by 0 days.

(21) Appl. No.: 18/230,246

(22) Filed: Aug. 4, 2023

(65) Prior Publication Data
US 2024/0043079 A1 Feb. 8, 2024

(30) Foreign Application Priority Data

Aug. 4, 2022 (DE) ...................... 10 2022 208 113.7
Aug. 15, 2022 (DE) ...................... 10 2022 208 453.5

(51) Int. Cl.
*B62D 65/02* (2006.01)
*F16B 2/00* (2006.01)

(52) U.S. Cl.
CPC .............. *B62D 65/022* (2013.01); *F16B 2/00* (2013.01)

(58) Field of Classification Search
CPC .......... B62D 65/022; B62D 65/02; F16B 2/00
See application file for complete search history.

(56) References Cited

U.S. PATENT DOCUMENTS

| | | | | |
|---|---|---|---|---|
| 4,392,601 A | * | 7/1983 | Fujikawa | B23P 19/04 29/430 |
| 4,667,805 A | * | 5/1987 | Antoszewski | B23P 19/10 271/238 |
| 4,893,398 A | * | 1/1990 | Zimmer | B62D 65/02 483/14 |
| 4,928,383 A | * | 5/1990 | Kaczmarek | B23P 21/008 29/711 |
| 4,944,445 A | * | 7/1990 | Zimmer | B23K 37/047 219/79 |
| 5,133,206 A | * | 7/1992 | Jackson | B21D 39/03 72/452.1 |

(Continued)

FOREIGN PATENT DOCUMENTS

DE 28 10 822 A1 9/1978
DE 32 30 455 A1 12/1983

(Continued)

*Primary Examiner* — Lawrence Averick
(74) *Attorney, Agent, or Firm* — thyssenkrupp North America, LLC

(57) ABSTRACT

The present disclosure relates to a processing station and to a method for connecting a first component to a second component in a processing station, wherein a workpiece holder is moved into a geometry clamping station of the processing station, wherein a clamping jig of the processing station in a first movement, and the workpiece holder moved into the geometry clamping station in a second movement, are simultaneously moved in each case from a preliminary position (PS1, PW1) to a connecting position (P2) in which the first component is connected to the second component.

3 Claims, 14 Drawing Sheets

(56) References Cited

U.S. PATENT DOCUMENTS

| | | | | |
|---|---|---|---|---|
| 5,186,304 | A * | 2/1993 | Kaczmarek | B62D 65/02 |
| | | | | 29/785 |
| 5,319,840 | A * | 6/1994 | Yamamoto | B62D 65/02 |
| | | | | 29/430 |
| 5,380,978 | A * | 1/1995 | Pryor | B23K 26/0846 |
| | | | | 219/121.79 |
| 5,427,300 | A | 6/1995 | Quagline | |
| 5,873,165 | A * | 2/1999 | Bode | B62D 65/02 |
| | | | | 198/465.1 |
| 6,293,454 | B1 | 9/2001 | Zhang et al. | |
| 6,394,440 | B1 * | 5/2002 | Carrell | H01L 21/67126 |
| | | | | 156/348 |
| 6,644,637 | B1 * | 11/2003 | Shen | B25B 5/061 |
| | | | | 269/152 |
| 7,178,227 | B2 * | 2/2007 | Ghuman | B62D 65/02 |
| | | | | 29/559 |
| 11,155,314 | B1 * | 10/2021 | Gatta | B65G 37/00 |
| 11,478,882 | B2 * | 10/2022 | Lee | B62D 65/00 |
| 2012/0145514 | A1 | 6/2012 | Magni et al. | |
| 2018/0043475 | A1 * | 2/2018 | Lee | B23K 37/0452 |
| 2024/0165754 | A1 * | 5/2024 | Tomasi | B62D 65/18 |

FOREIGN PATENT DOCUMENTS

| | | |
|---|---|---|
| DE | 35 06 314 A1 | 8/1986 |
| DE | 44 31 384 A1 | 9/1995 |
| DE | 198 20 094 A1 | 11/1999 |
| DE | 198 82 787 T1 | 4/2001 |
| DE | 10 2019 204 612 A | 10/2020 |
| EP | 1890929 A2 | 2/2008 |
| EP | 2 279 929 A1 | 2/2011 |
| GB | 1564669 A | 4/1980 |
| GB | 2122142 A | 1/1984 |
| JP | H07136798 A | 5/1995 |

* cited by examiner

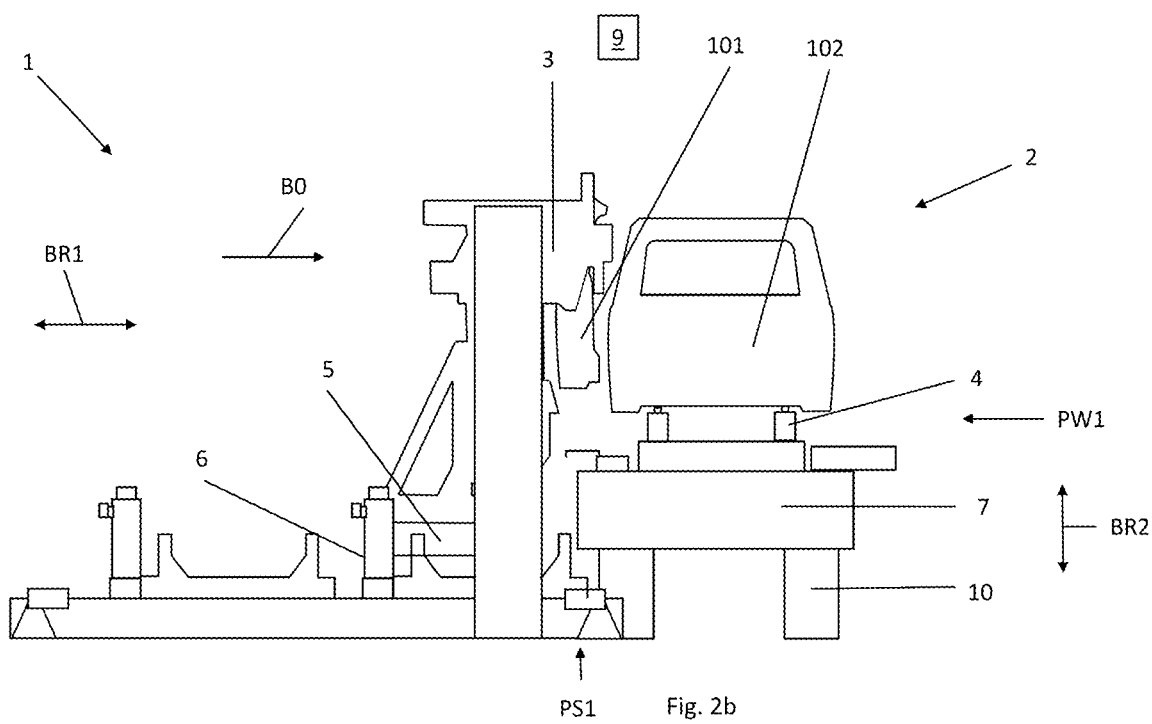

METHOD AND PROCESSING STATION FOR CONNECTING COMPONENTS OF A VEHICLE BODY

CROSS REFERENCE TO RELATED APPLICATION

This application is a U.S. Non-Provisional that claims priority to German Patent Application No. DE 10 2022 208 113.7, filed Aug. 4, 2022, and to German Patent Application No. DE 10 2022 208 453.5, filed Aug. 15, 2022, and the entire content of which is incorporated herein by reference.

FIELD

The disclosure generally relates to a method for connecting, in particular joining, a first component of a vehicle body to a second component of a vehicle body in a processing station, wherein a workpiece holder is moved into a geometry clamping station of the processing station. Herein, the second component, or a component assembly comprising the first and the second component, is in particular disposed on the workpiece holder.

BACKGROUND

A method for assembling components of a vehicle body in a processing station having a geometry clamping device is known in the prior art, for example from EP 1890929B1, wherein the geometry clamping device therein is referred to as geometry box.

The disclosure relates to a processing station for connecting, in particular joining, a first component of a vehicle body to a second component of a vehicle body, comprising a geometry clamping station and a clamping jig, wherein the clamping jig is disposed on a movably configured support unit which by means of a first drive unit can be moved in a first direction of movement, and wherein the geometry clamping station has a receptacle unit which is configured to receive a workpiece holder.

These processing stations serve, for example, to clamp vehicle body parts in a defined exact position, the connecting position, and in particular to subsequently finally connect said body parts by a joining procedure. The joining procedure may be welding, adhesive bonding, riveting or else clinching. Clamping jigs are used for the procedure of exactly positioning the one body component, for example a side wall, on another body component, for example a floor assembly. One or a plurality of these clamping jigs here can be kept handy or stocked in a magazine region, and by means of a feeding device be displaced or transported to the operating region and back. A clamping jig is used herein in the prior art in particular to move a body component, which in a preceding assembly step has been tentatively positioned on a second body component by lashes or clips, into a final position defined by the construction, wherein the second component is held by a workpiece holder in a geometry clamping station. The workpiece holder, also referred to as a skid, in the process is usually moved into the geometry clamping station by way of a roller track.

It is furthermore known to configure the clamping jig as an upright, largely flat support frame on which a plurality of activatable clamping fixtures are held, by way of which the body components are mutually braced at predetermined points so as to be joined at the latter. It is known in particular in the prior art that a clamping jig for bracing body parts comprises a clamping group which is pivotable by way of a pivoting unit, wherein the clamping group by means of the pivoting unit can carry out a type of threading movement in order to be able to suitably position the clamping group for bracing components. It is also known in particular that such a clamping jig may have a plurality of clamping groups which are pivotable by means of a plurality of pivoting units.

In the prior art it is disadvantageous here that these processing stations, or the known methods, for connecting the components provide that the first component is offered up frontally to the second component, in particular provide that the components are connected at a fixed connection angle of 180°. As a result, the use of such processing stations is however restricted in the case of deviating geometries of the body. Furthermore, in processing stations known in the prior art it is disadvantageous that the pivoting units for pivoting clamping groups can end up being very large and heavy. Because the pivoting units moreover often have to be disposed at the upper end of the clamping jig, thus at the end that faces away from the support unit and thus in a top-heavy arrangement, this frequently results in an unfavourable distribution in terms of the center of gravity, this potentially having a negative effect on the service life of the processing station. While a slower displacement of the clamping jigs may indeed increase the service life, this however has a negative effect on the cycle time.

Thus a need exists to improve a method for connecting a first component of a vehicle body to a second component of a vehicle body in a processing station which comprises a geometry clamping station and a clamping jig, and to improve such a processing station. It is provided in particular that a connection angle that deviates from a connection angle of 180° is implemented, whereby the connection angle is preferably adaptable. Furthermore advantageously, the disadvantages of a pivoting unit of a clamping group that is disposed in a top-heavy manner are to be avoided.

BRIEF DESCRIPTION OF THE FIGURES

Further advantageous details, features and details of the disclosure will be explained in more detail in the context of the exemplary embodiments illustrated in the figures (FIG.: Figure), in which:

FIG. 2b shows the processing station according to FIG. 2a in a preliminary position;

FIG. 6c in a simplified lateral view shows a clamping jig having a clamping group for a processing station according to FIG. 6a.

DETAILED DESCRIPTION

Figure 1A:
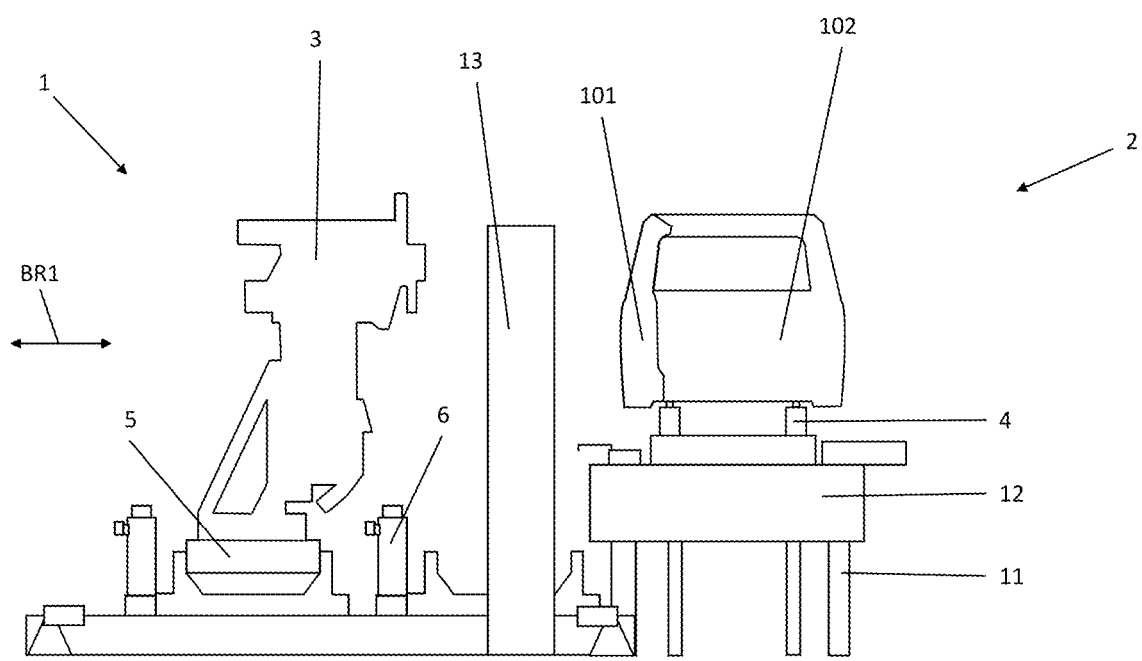
FIG. 1a shows a processing station known in the prior art in a preliminary position.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

A method for joining a first component to a second component, as well as a processing station, according to the independent claims are proposed in order to achieve this object. Further advantageous embodiments of the disclosure are described in the dependent claims and the description, and illustrated in the figures.

The proposed solution provides a method for connecting, in particular for joining, a first component to a second component in a processing station, wherein a workpiece holder is moved into a geometry clamping station of the processing station, a clamping jig of the processing station in a first movement, and the workpiece holder moved into the geometry clamping station in a second movement, are in each case moved from a preliminary position to a connecting position, in particular simultaneously from a preliminary position to a connecting position. The first component is then connected to the second component in the connecting position, wherein a first direction of movement of the first movement and a second direction of movement of the second movement are not parallel.

It is provided in particular that the clamping jig in a horizontal movement as the first movement is moved from its preliminary position to the connecting position. The workpiece holder in a vertical movement as the second movement is in particular moved from its preliminary position to the connecting position. The first movement is advantageously carried out at a first velocity, and the second movement is advantageously carried out at a second velocity. It is provided in particular that the first velocity is a velocity different from the second velocity. Furthermore advantageously, an angle is defined at which the clamping jig and the workpiece holder are to attain the connecting position, wherein at a defined first direction of movement and a defined second direction of movement the first velocity and the second velocity are determined such that the clamping jig and the workpiece holder attain the connecting position at the defined angle. The definition of the angle takes place in particular in relation to a previously established reference plane. The floor on which the processing station is set up can in particular be established as the reference plane here.

According to a further advantageous embodiment, a motion sequence is defined according to which the clamping jig and the workpiece holder are to attain the connecting position, wherein at a defined first direction of movement and a defined second direction of movement the first velocity and the second velocity are determined such that the clamping jig and the workpiece holder attain the connecting position according to the defined motion sequence.

Provided in particular for achieving the object mentioned at the outset is a method for connecting, in particular for joining, a first component, in particular a first vehicle body component, to a second component, in particular a second vehicle body component, in a processing station, wherein the first component is moved into a clamping jig of the processing station; the first component is fixed in the clamping jig; the second component on a workpiece holder is moved into a geometry clamping station of the processing station; and the clamping jig that has the first component in a first movement, and the workpiece holder that has the second component in a second movement, are simultaneously moved in each case from a preliminary position to a connecting position, wherein a first direction of movement of the first movement and a second direction of movement of the second movement are advantageously not parallel. In the connecting position, the first component and the second component are advantageously braced in relation to one another and connected; welding can in particular be provided once the connecting position has been attained.

In this embodiment of the method, the first movement of the clamping jig thus advantageously commences so as to proceed from the preliminary position of the clamping jig. The second movement of the workpiece holder advantageously commences so as to proceed from the preliminary position of the workpiece holder. The respective preliminary positions here are advantageously established in advance. The first component can in particular be an outer skin, or a side panel, of a vehicle body. The second component can in particular be a floor assembly of a vehicle body. As a result of the first direction of movement of the first movement and the second direction of movement of the second movement advantageously not being parallel, connecting the first component to the second component advantageously takes place at a connection angle that deviates from 180°. In this way, the first component is advantageously not offered up frontally to the second component, as would be the case with a connection angle of 180°, but the first component is advantageously offered up obliquely to the second component. As a result, it is advantageously made possible that the first component has an undercut and the first component is simply offered up obliquely to the second component, in particular without the second component having to be reoriented in the workpiece holder. The second component can advantageously be disposed so as to be identically oriented in the workpiece holder, independently of the desired connection angle. The workpiece holder, in particular a skit, is advantageously moved into the geometry clamping station by way of a roller track, wherein the workpiece holder here advantageously already supports the second component but in this variant of the method in particular does not support the first component. New geometries in components of a vehicle body arise in particular in the production of electric vehicles because battery trays for receiving battery modules for an electric vehicle render other geometries advantageous or even necessary, said geometries not having been used in vehicles with internal combustion engines, for example.

One advantageous refinement of the method provides that the clamping jig that has the first component in a horizontal movement as the first movement is moved from its preliminary position to the connecting position. It is provided in particular that the clamping jig that has the first component can be moved exclusively in the horizontal movement. By displacing the clamping jig by way of the horizontal movement, the first component is advantageously moved into the geometry clamping station where connecting to the second component takes place in particular. Carrying out the horizontal movement is advantageously easy to implement because such a horizontal movement is also carried out when frontally connecting components of a vehicle body as known in the prior art.

According to a further advantageous embodiment of the method, the workpiece holder that has the second component in a vertical movement as the second movement is moved from its preliminary position to the connecting position, in particular by means of a lifting element which advantageously vertically displaces the workpiece holder that has the second component. The first construction element is thus advantageously displaced horizontally in relation to the second construction element, while the second construction element is advantageously simultaneously displaced vertically, as a result of which the first component and the second component are advantageously converged at a connection angle which differs from 180°, thus converged obliquely. The vertical movement is advantageously easy to control. The second component, or the workpiece holder that supports the second component, respectively, advantageously does not have to be tilted in order to attain the desired connection angle.

Furthermore advantageously the first movement is carried out at a first velocity, and the second movement is carried out at a second velocity. The starting point for the respective movement here is the respective preliminary position. The first velocity and the second velocity may be identical or different but in particular such that the first component and the second component attain the connecting position at the same time. A velocity profile, in particular a first velocity profile for the first velocity and a second velocity profile for the second velocity, respectively, can in each case be defined in particular for the first velocity at which the first component is moved by the clamping jig in the first direction of movement, and/or for the second velocity at which the second component is moved by the workpiece holder in the second direction of movement. By carrying out the movements of the first component in the first direction of movement and those of the second component in the second direction of movement, different connection angles can advantageously be achieved solely by adapting the first velocity and/or the second velocity. The first direction of movement and the second direction of movement advantageously remain unchanged in the process, this advantageously simplifying the basic design of the drive units and thus being cost effective.

It is provided in particular that a connection angle is defined at which the first component and the second component are to be converged, wherein at a defined first direction of movement and a defined second direction of movement the first velocity and the second velocity are determined such that the first component and the second component attain the connecting position at the defined connection angle. In the process, the first component is in particular moved at all times in the horizontal direction, and the second component is in particular moved at all times in the vertical direction. Once the connecting position has been attained, the first component and the second component are advantageously connected to one another by a joining process.

It is furthermore provided in particular that a motion sequence is defined according to which the first component and the second component are to be converged, wherein at a defined first direction of movement and a defined second direction of movement the first velocity and the second velocity are determined such that the first component and the second component are moved to the connecting position according to the defined motion sequence. The motion sequence here can be defined in particular by a sequence of points, in particular for a control unit by which the method is controlled. The motion sequence can in particular be a motion curve, a linear motion, or a staged motion. The first component here is in particular moved in the horizontal direction, and the second component is in particular moved in the vertical direction. Once the connecting position has been attained, the first component and the second component are advantageously connected to one another by a joining process.

A further advantageous embodiment provides that, prior to moving to the connecting position, an adhesive is applied to a connecting face of the first component that contacts the second component when connecting the first component to the second component. Alternatively or additionally it is provided that, prior to moving to the connecting position, an adhesive is applied to a connecting face of the second component that contacts the first component when connecting the first component to the second component. Owing to the fact that the connection angle can advantageously be suitably defined, the applied adhesive is advantageously not smudged when the components are being joined.

It is furthermore advantageously provided that the first component is moved into the clamping jig by a robot. In this respect, the first component is in particular not attached to the second component by lashes or clips prior to being connected or joined. The clamping jig is advantageously in a receiving position when the first component is moved into the clamping jig and fixed therein. The clamping jig is then advantageously moved conjointly with the first component from the receiving position to the preliminary position. The receiving position here in spatial terms is advantageously in front of the preliminary position. One variant can also provide that the receiving position coincides with the preliminary position.

A further advantageous embodiment of the method provides that a third component is moved into a further clamping jig of the processing station, and the third component is fixed in the further clamping jig. In order for the third component to be connected to the second component, the same method steps are then carried out in terms of the further clamping jig as have been mentioned in the context of the clamping jig already described, hereunder referred to as the first clamping jig. This means that the further clamping jig that has the third component in particular also in a third movement, and the workpiece carrier that has the second component in a second movement, are simultaneously moved in each case from a preliminary position to a connecting position in which the third component is then connected to the second component, wherein a third direction of movement of the third movement and a second direction of movement of the second movement are in particular not parallel. The further clamping jig is preferably moved in a synchronous manner with the first clamping jig. In this way, a left side panel of a vehicle body and a right side panel of a vehicle body can in particular be connected in a synchronous manner to a body.

Proposed as a further advantageous variant of the disclosure for achieving the object mentioned at the outset is a method for connecting, in particular for joining, a first component, in particular a first vehicle body component, to a second component, in particular a second vehicle body component, in a processing station, wherein the second component and the first component, the latter being provisionally disposed on the second component, form a component assembly which on a workpiece holder is moved into a geometry clamping station of the processing station. A clamping jig of the processing station that has a clamping group in a first movement, and the workpiece holder that has the component assembly in a second movement, are then in each case moved from a preliminary position to a connecting position. A first direction of movement of the first movement of the clamping jig and a second direction of movement of the second movement of the workpiece holder are not parallel. In the connecting position, the clamping jig is fixed by a fixing element or a plurality of fixing elements of the geometry clamping station. In the connecting position, the first component and the second component are advantageously braced in relation to one another and then joined; welding can in particular be provided once the connecting position has been attained. The first component is in particular tentatively positioned on the second component by lashes or else clips as a provisional arrangement. It is provided in particular that the clamping jig can have not only one clamping group but also a plurality of clamping groups. The following explanations pertaining to a clamping jig having a clamping group thus apply in analogous manner to a clamping jig having a plurality of clamping groups, and in particular also having a plurality of pivoting units.

In this embodiment of the method, the first movement of the clamping jig advantageously thus commences so as to proceed from the preliminary position of the clamping jig. The second movement of the workpiece holder advantageously commences so as to proceed from the preliminary position of the workpiece holder. The respective preliminary positions here are advantageously established in advance. The first component can in particular be an outer skin or a side panel of a vehicle body. The second component can in particular be a floor assembly of a vehicle body. As a result of the first direction of movement of the first movement and the second direction of movement of the second movement advantageously not being parallel, converging the clamping group of the clamping jig and the component assembly disposed on the workpiece holder advantageously takes place at an angle that deviates from 180°. In this way, the clamping group is advantageously not moved only frontally towards the component assembly as would be the case at an angle of 180°. Instead, as a result of the overall motion sequence of first movement and second movement, the clamping group is advantageously converged obliquely with the component group. As a result, it is advantageously made possible that a pivoting unit for pivoting the clamping group can be dispensed with because the clamping group as a result of the overall motion sequence of first movement and second movement can advantageously circumvent "obstacles" such as projecting body elements on the way to the connecting position. It is in particular provided that the clamping jig and the workpiece holder are moved simultaneously to the connecting position.

The component assembly can advantageously be disposed so as to be identically oriented in the workpiece holder, independently of the desired angle at which the clamping jig, or the clamping group having the component assembly, are to be converged. The workpiece holder, in particular a skid, is advantageously moved into the geometry clamping station by way of a roller track, wherein the workpiece holder here advantageously already supports the component assembly.

One advantageous embodiment of the method provides that the clamping jig in a horizontal movement as the first movement is moved from its preliminary position to the connecting position. It is in particular provided that the clamping jig can be moved exclusively in the horizontal movement. Carrying out the horizontal movement is advantageously simple to implement because such a horizontal movement is also carried out when connecting components of a vehicle body in a processing station as known in the prior art.

According to a further advantageous embodiment of the method, the workpiece holder that has the component assembly in a vertical movement as the second movement is moved from its preliminary position to the connecting position, in particular by means of a lifting element which advantageously vertically displaces the workpiece holder having the component assembly. In this way, the clamping jig that has the clamping group is advantageously moved horizontally into the processing station while the component assembly is advantageously vertically displaced at the same time, as a result of which the clamping jig, or the clamping group of the clamping jig, and the component assembly are advantageously converged at an angle that differs from 180°, thus converged obliquely. The vertical movement is advantageously easy to control. The component assembly, or the workpiece holder that supports the component assembly, respectively, advantageously does not have to be tilted in order to attain the desired angle for converging.

The first movement is furthermore advantageously carried out at a first velocity, and the second movement is carried out at a second velocity. The respective preliminary position is the initial point for the respective movement here. The first velocity and the second velocity can be identical or different. In particular, the first velocity and the second velocity are however determined so that the clamping jig, or the clamping group, and the component assembly attain the connecting position at the same time. A velocity profile, in particular a first velocity profile for the first velocity, and a second velocity profile for the second velocity, can in particular in each case be defined for the first velocity at which the clamping jig is moved in the first direction of movement, and/or for the second velocity at which the component assembly is moved by the workpiece holder in the second direction of movement, respectively. By carrying out the movements of the clamping jig in the first direction of movement and of the component assembly in the second direction of movement, different angles at which the clamping jig, or the clamping group, are converged with the component assembly can advantageously be attained solely by adapting the first velocity and/or the second velocity. The first direction of movement and the second direction of movement advantageously remain unchanged in the process, this advantageously simplifying the basic design of the drive units and thus being cost effective.

It is provided in particular that an angle is defined at which the clamping groups of the clamping jig and the component assembly are to be converged, wherein at a defined first direction of movement and a defined second direction of movement the first velocity and the second velocity are determined such that the clamping group and the component assembly attain the connecting position at the defined angle. The clamping jig here is in particular moved at all times in the horizontal direction, and the component assembly is moved at all times in the vertical direction. Once the connecting position has been attained, the first component and the second component are advantageously connected to one another by a joining process.

It is furthermore particularly provided that a motion sequence is defined according to which the clamping groups of the clamping jig and the component assembly are to be converged, wherein at a defined first direction of movement and a defined second direction of movement the first velocity and the second velocity are determined such that the clamping group and the component assembly attain the connecting position according to the defined motion sequence. The motion sequence here can in particular be defined by a sequence of points, in particular for a control unit by which the method is controlled. The motion sequence can in particular be a motion curve, a linear motion, or a staged motion. The clamping jig here is in particular moved in the horizontal direction, and the workpiece holder having the component assembly is in particular moved in the vertical direction. Once the connecting position has been attained, the first component and the second component are advantageously connected to one another by a joining process.

It is provided in particular that no relative movement in relation to the clamping jig is carried out by the clamping group, thus that the clamping group is in particular not pivoted in addition to the movement of the clamping jig in order to attain the connecting position. A pivoting unit for pivoting the clamping group relative to the clamping jig is thus advantageously dispensable.

A further advantageous embodiment of the method provides that the component assembly comprises a third component which is provisionally disposed on the second component, in particular in that the third component is provisionally disposed on the second component by lashes or clips. In this instance, a further clamping jig of the processing station that has a further clamping group in a third movement from a preliminary position of the further clamping jig, and the workpiece holder that has the component assembly in the second movement from its preliminary position, are moved to a connecting position, in particular moved simultaneously, wherein the further clamping jig in the connecting position is fixed by a further fixing element of the geometry clamping station, and wherein in terms of the further clamping jig the same method steps are carried out as mentioned in the context of the previously mentioned clamping jig, hereunder also referred to as the first clamping jig. This means that the further clamping jig in particular also in a third movement, and the workpiece holder that has the component assembly in a second movement, are in each case moved simultaneously from a preliminary position to a connecting position in which the third component is then joined to the second component, wherein a third direction of movement of the third movement and a second direction of movement of the second movement are in particular not parallel. The further clamping jig is preferably moved in a synchronous manner with the first clamping jig. In this way, a left side panel of a vehicle body and a right side panel of a vehicle body can in particular be connected in a synchronous manner to a body.

The processing station which is furthermore provided for achieving the object mentioned at the outset for connecting, in particular for joining, a first component of a vehicle body to a second component of a vehicle body comprises a geometry clamping station and a clamping jig, wherein the clamping jig is disposed on a mobile support unit which by means of a first drive unit can be moved in a first direction of movement. Moreover, the geometry clamping station has a receptacle unit which is configured to receive a workpiece holder, wherein the receptacle unit is assigned a second drive unit by way of which the receptacle unit can be moved in a second direction of movement. The first direction of movement and the second direction of movement here are not parallel. The processing station is furthermore assigned a control unit which is configured to control the first drive unit and the second drive unit in such a manner that the clamping jig and the workpiece holder are moved to a connecting position.

The support unit by means of the first drive unit is advantageously configured to be moved in a horizontal direction as the first direction of movement. Furthermore advantageously, the receptacle unit by means of the second drive unit is configured to be moved in a vertical direction as the second direction of movement, in particular by means of a lifting unit. The processing station is preferably configured to carry out a method designed according to the disclosure.

Provided in particular for achieving the object mentioned at the outset is a processing station for connecting, in particular for joining, a first component of a vehicle body to a second component of a vehicle body, which processing station comprises a geometry clamping station and a clamping jig. In this variant, the clamping jig is configured to receive the first component and disposed on a mobile support unit, wherein the support unit by means of a first drive unit can be moved in a first direction of movement. A first component received by the clamping jig can thus advantageously be moved in the first direction of movement. In this variant, the geometry clamping station of the processing station has a receptacle unit which is configured to receive a workpiece holder that supports the second component. The receptacle unit here is assigned a second drive unit by way of which the receptacle unit can be moved in a second direction of movement. The first direction of movement and the second direction of movement here are advantageously not parallel. The processing station is furthermore assigned a control unit. It is provided in particular that the processing station comprises the control unit. The control unit here is in particular an electronic control unit which is in particular a correspondingly specified computer unit, in particular a microcontroller unit. The control unit is configured to control the first drive unit and the second drive unit in such a manner that a first component received by the clamping jig and a second component received by the receptacle unit by way of a workpiece holder are moved simultaneously to a connecting position in which the first component is connected, in particular joined, to the second component. The processing station in this way advantageously makes it possible to define different connection angles at which the construction elements are to be moved to the connecting position for subsequent joining of the construction elements. The first construction element is in particular a side panel of a vehicle body, or an outer skin of a side panel of a vehicle body. The second component is in particular the basic body, or a floor assembly of a vehicle body.

According to one advantageous embodiment of this processing station, the support unit by means of the first drive unit is configured to be moved in a horizontal direction as the first direction of movement, in particular to the receptacle unit. A first component received by the clamping jig can thus advantageously be moved into the geometry clamping station in a horizontal movement. It is provided in particular that the support unit is a horizontally displaceable slide.

A further advantageous embodiment of the processing station provides that the receptacle unit by means of the second drive unit is configured to be moved in a vertical direction as the second direction of movement, in particular by means of a lifting unit. It is provided in particular that the receptacle unit is disposed on a lifting unit. The receptacle unit can in particular be part of the lifting unit.

The processing station is advantageously configured to carry out a method configured according to the disclosure. The processing station here can in particular also comprise a user interface for defining a connection angle and/or a motion sequence by a user. The processing station can furthermore particularly also comprise a robot by which a first component can be moved into the clamping jig. The geometry clamping station can furthermore advantageously comprise a roller track or a roller track section by way of which a second component can advantageously be moved into the geometry clamping station. It is provided in particular that the roller track portion here is disposed on the lifting element. The processing station can furthermore particularly comprise at least one further clamping jig by way of which a further component can be disposed on the second component.

Moreover provided for achieving the object mentioned at the outset is a processing station for joining a first component of a vehicle body to a second component of a vehicle body, wherein the second component and the first component, the latter being provisionally disposed on the second component, form a component assembly. This processing station comprises a geometry clamping station, a clamping jig having a clamping group, and at least one fixing element for fixing the clamping jig in a connecting position. It is in particular provided also here that the clamping jig can have not only one clamping group but also a plurality of clamping groups. The clamping jig here is disposed on a mobile support unit, wherein the support unit by means of a first drive unit can be moved in a first direction of movement. The geometry clamping station of the processing station has a receptacle unit which is configured to receive a workpiece holder that supports the component assembly. The receptacle unit here is assigned a second drive unit by which the receptacle unit can be moved in a second direction of movement. The first direction of movement and the second direction of movement here are advantageously not parallel. The processing station is furthermore assigned a control unit. It is provided in particular that the processing station comprises the control unit. The control unit here is in particular an electronic control unit which is in particular a correspondingly specified computer unit, in particular a microcontroller unit. The control unit is configured to control the first drive unit and the second drive unit in such a manner that the clamping group of the clamping jig and a component assembly received by the receptacle unit by way of a workpiece holder are moved to a connecting position, in particular moved simultaneously to the connecting position, wherein the first component can be joined, in particular welded, to the second component in the connecting position. In this way, the processing station advantageously makes it possible to define different angles at which the clamping group and the component assembly are to be converged. The first construction element is in particular a side panel of a vehicle body, or an outer skin of a side panel of a vehicle body. The second component is in particular the basic body, or a floor assembly, of a vehicle body.

According to one advantageous embodiment, the support unit by means of the first drive unit is configured to be moved in a horizontal direction as the first direction of movement, in particular in a horizontal direction in relation to the receptacle unit. It is provided in particular that the support unit is a horizontally displaceable slide.

A further advantageous embodiment of the processing station provides that the receptacle unit by means of the second drive unit is configured to be moved in a vertical direction as the second direction of movement, in particular by means of a lifting unit. It is provided in particular that the receptacle unit is disposed on a lifting unit. The receptacle unit can in particular be part of the lifting unit.

The processing station is advantageously configured to carry out a method configured according to the disclosure. The processing station here can in particular also comprise a user interface for defining an angle at which the clamping group and the component assembly are to be converged, and/or a motion sequence by a user. The processing station can furthermore particularly also comprise a robot by which the components can be tentatively positioned in relation to the component assembly. The geometry clamping station can furthermore advantageously comprise a roller track or a roller track section by way of which a component assembly to be joined can advantageously be moved into the geometry clamping station. It is provided in particular that the roller track section here is disposed on the lifting element. According to an alternative embodiment, the component assembly can also be lifted to the respective height by the roller track, in particular by way of a correspondingly configured clamping mechanism on the lifting element. Furthermore, the processing station can in particular comprise at least one further clamping jig by way of which a further component of the component assembly can be clamped in a connecting position so as to connect the further component and the second component by joining, in particular by welding.

The clamping jig advantageously does not comprise any pivoting unit for pivoting the clamping group relative to the clamping jig. As a result of the displaceability of the clamping jig and the workpiece holder provided according to the disclosure, pivoting units, or pivotable clamping groups, are advantageously dispensable. A clamping jig of reduced weight can advantageously be used in this way. Moreover, installation space is advantageously gained which can be utilized in particular for the use of robotic welding guns. In this way, more welding points advantageously can be implemented when joining the components, which advantageously improves the connection of the components or may be utilized for shortening the cycle time, respectively.

In the various figures, identical parts are typically provided with the same reference signs and are therefore occasionally also explained only in the context of one of the figures. In particular, a first variant of the disclosure is explained with reference to FIG. 1a to FIG. 4b, and a second variant of the disclosure is explained with reference to FIG. 5a to FIG. 7e.

Figure 1B:
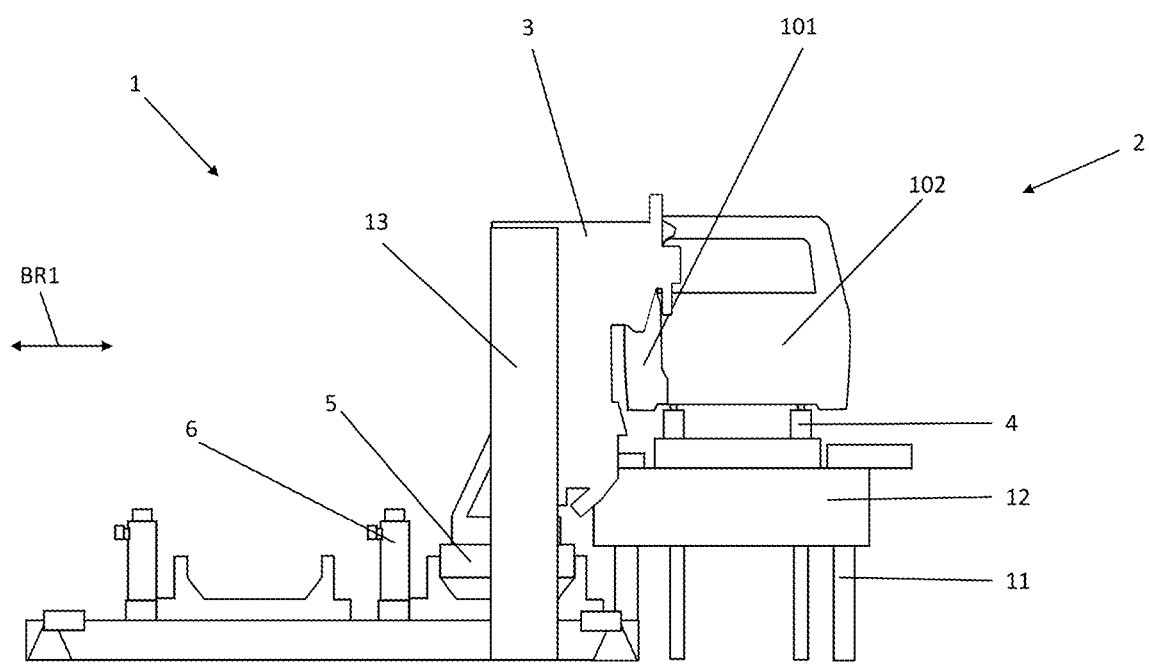
FIG. 1b shows the processing station according to FIG. 1a in a connecting position.

Shown in FIG. 1a is a processing station 1 known in the prior art, having a geometry clamping station 2 and a clamping jig 3 which is displaceable in the horizontal direction BR1. Here, a side panel 101 as the first component is attached to a body 102 as the second component by clips before the construction elements 101, 102 are moved into the geometry clamping station 2. In the process, the body using a skid as a workpiece holder 4 moves into the geometry clamping station 2 by way of a roller track 12 having an elevation 11. The clamping jig 3 is then displaced in the horizontal direction BR1 towards the geometry clamping station 2 and on the latter braced on a fixing element 13, as is shown in FIG. 1*b*. The clamping jig 3 then clamps the body 102 and the side panel 101 in a connecting position, and a welding process for connecting the side panel 101 to the body 102 commences. It is problematic inter alia here that a side panel 101 having an undercut 111, as shown in FIG. 4*b*, cannot be connected in this way to a body 102 by such a horizontal movement BR1 of the clamping jig 3 at a connection angle VA of 180°, as is shown in FIG. 1*a* and FIG. 1*b*.

Figures 4A, 4B:
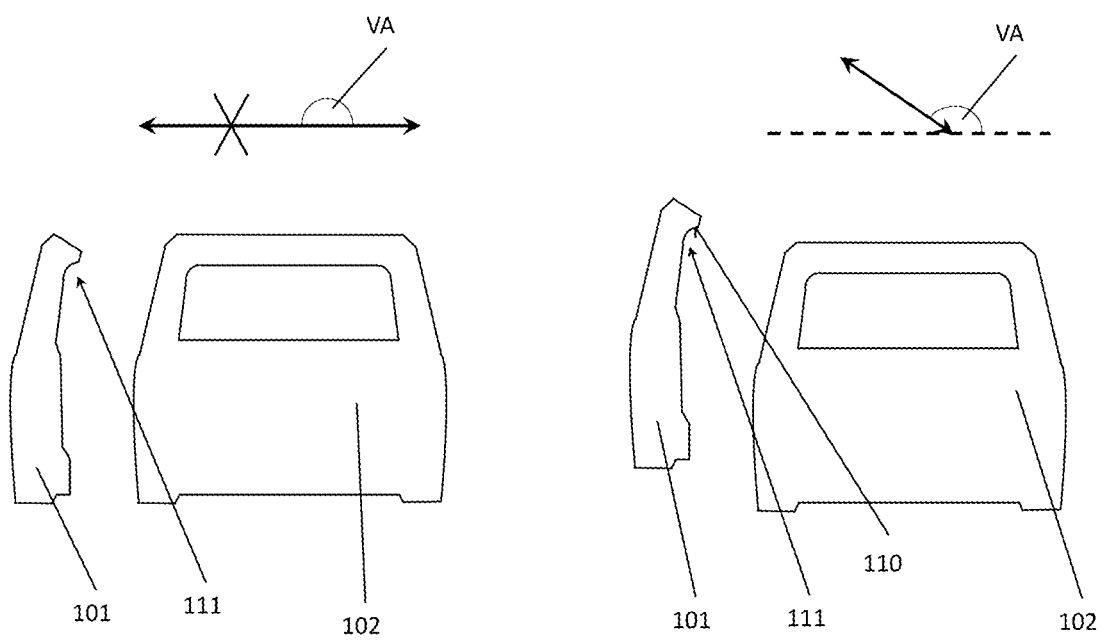
FIG. 4a shows the set of issues when joining two components at a connection angle of 180°.
FIG. 4b shows the joining of two components according to a method according to the disclosure at a connection angle that differs from 180°.

This issue can be solved in that a connection angle VA which differs from 180°, as is shown in FIG. 4*b*, is defined, by way of which the side panel 101 and the body 102 are connected in a connecting position. A method and a processing station which are suitable for connecting a side panel 101 as the first component to a body 102 as a second component, even when such an undercut 111 is present, will be explained in more detail with reference to FIG. 2*a* to FIG. 2*c*.

Figure 2A:
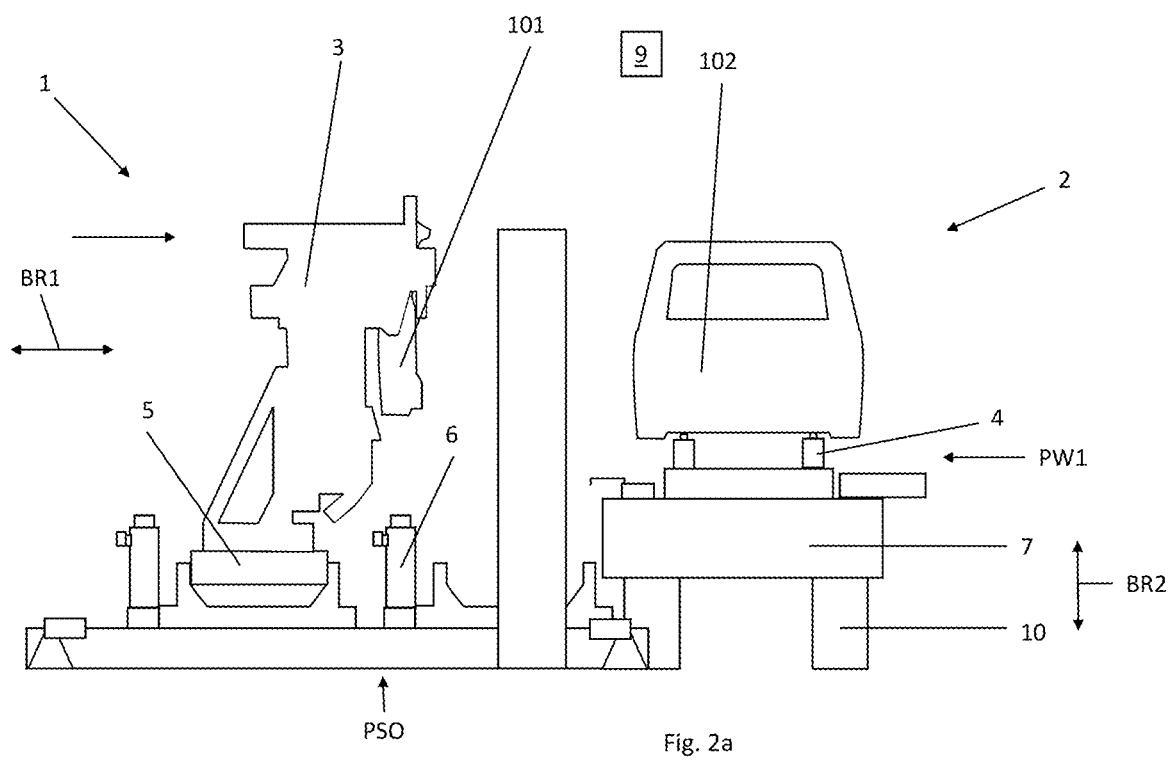
FIG. 2a shows an embodiment of a processing station according to the disclosure, in a receiving position for a first component.

FIG. 2*a* here shows an exemplary embodiment of a processing station 1 configured according to the disclosure for connecting a first component 101 to a second component 102, wherein in this exemplary embodiment the first component 101 is a side panel as the body component, and the second component 102 is a body. The processing station 1 comprises a geometry clamping station 2, also referred to as a geobox, and a clamping jig 3 which is configured for receiving the first component 101. The clamping jig 3 is disposed on a mobile support unit 5. The support unit and thus also the clamping jig 3 are displaceable in a horizontal direction as the first direction of movement BR1 by means of a first drive unit 6 which here comprises in particular an electric motor. The drive unit 6 here is controlled by an electronic control unit 9 of the processing station 1.

Only one clamping jig 9 is illustrated to the left of the geometry clamping station 2 in FIG. 2*a*, wherein a further clamping jig in particular for attaching side panels to a body can be provided to the right of the geometry clamping station 2, wherein the further clamping jig is advantageously controlled in the same way as the clamping jig 3 so that both clamping jigs advantageously carry out the same method steps, in particular in a synchronous manner.

Shown in FIG. 2*a* is the processing station 1 in which the clamping jig 3 is situated in a receiving position PS0. In this receiving position PS0 the side panel 101 is incorporated in the clamping jig 3, in particular by means of a robot not illustrated in FIG. 2*a*, and for fixing is clamped in the clamping jig 3.

The geometry clamping station 2 of the processing station 1 comprises a receptacle unit 7 which in this exemplary embodiment is configured as a section of a roller track. The receptacle unit 7 of the geometry clamping station 2 is configured for receiving a workpiece holder 4 that supports the body 102, wherein the workpiece holder 4 in this exemplary embodiment is a skid. The body 102 in this exemplary embodiment is disposed on the workpiece holder 4 and by way of a roller track system moved into the geometry clamping station 2, wherein the workpiece holder 4 is received by the receptacle unit 7. The receptacle unit 7 here is disposed on a lifting unit 10 that comprises a second drive unit. By means of this lifting unit 10, which is assigned to the receptacle unit 7, the receptacle unit 7 can be moved in a vertical direction as the second direction of movement BR2. The second drive unit, or the lifting unit 10, respectively, is likewise controlled by means of the control unit 9 of the processing station 1. In FIG. 2*a*, the workpiece holder 4 by means of the lifting unit 10 is lowered and moved to a preliminary position PW1. It may be the case that for incorporating the workpiece holder 4 the receptacle unit 7 is initially disposed in a deviating position and the receptacle unit 7 by means of the lifting unit 10 is only moved to the preliminary position PW1 with the workpiece holder 4 incorporated. This is suitably controlled by the control unit 9. The control unit 9 is moreover configured to control the first drive unit 6 and the lifting unit 10 having the second drive unit in such a manner that the side panel 101, which is received by the clamping jig 3, and the body 102, which by way of the workpiece holder 4 is received by the receptacle unit 7, are moved simultaneously to a connecting position P2. The side panel 101 is then connected to the body 102 by joining in the connecting position P2.

Figure 2C:
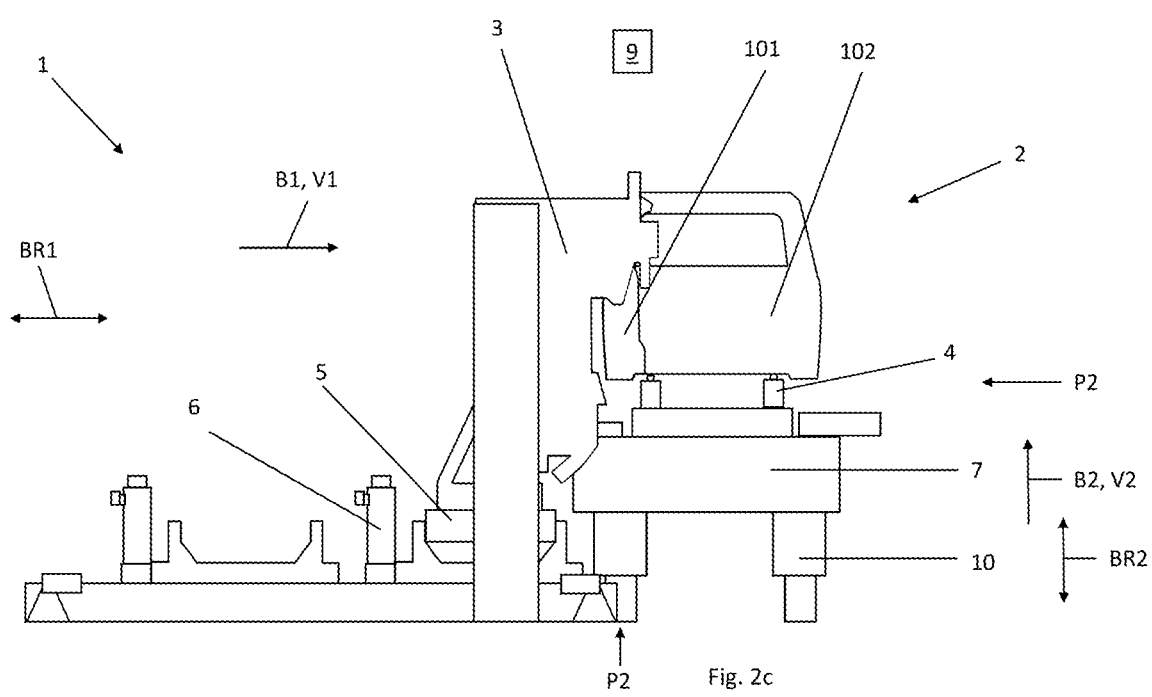
FIG. 2c shows the processing station according to FIG. 2a in a connecting position.

To this end, the clamping jig 3 having the side panel 101, proceeding from the receiving position PS0 shown in FIG. 2*a*, is initially displaced in a movement B0 in the horizontal direction BR1 to the geometry clamping station 2, to a preliminary position PS1 shown in FIG. 2*b*, from which finally the moving of the clamping jig 3 by way of the motion sequence defined for the clamping jig 3 commences simultaneously with the moving of the workpiece holder 4 by way of the motion sequence defined for the workpiece holder 4. Proceeding from the preliminary position PS1, or the preliminary position PW1, respectively, the clamping jig 3 having the side panel 101 in a further horizontal movement B1, and the workpiece holder 4 having the body 102 in a vertical movement B2, are simultaneously moved in each case at a definable connection angle VA or a definable motion sequence BA to the connecting position P2, wherein the clamping jig 3 in the connecting position P2 is fixed to a fixing element 13 of the geometry clamping station 2. To this end, the fixing element 13 comprises in particular a plurality of tensioning clamps, detents and/or further fixing means for fixing the clamping jig 3 which are not explicitly shown in the figures. The side panel 101 and the body 102 can then be connected to one another in the connecting position P2. The processing station 1 is shown in FIG. 2*c*, wherein the clamping jig 3 having the side panel 101 and the workpiece holder 4 having the body 102 have attained the connecting position P2.

A welding process for connecting the side panel 101 to the body 102 can then in particular commence in the connecting position P2. However, it can in particular also be provided that, prior to moving to the connecting position P2, an adhesive is applied to a connecting face of the side panel 101 that contacts the body 102 when connecting to the body 102. Shown by way of example is a connecting face 110 of a first component configured as the side panel 101 in FIG. 4*a* and FIG. 4*b*. The connection angle VA for connecting the side panel 101 to the body 102 here can be defined such that the adhesive is not smudged by premature mutual friction of faces during connecting. By bracing the body 102 and the side panel 101 by means of the fixed clamping jig 3, the construction elements 101, 102 are then connected by adhesive bonding in the connecting position P2.

In order to attain a defined connection angle VA at which the side panel 101 and the body 102 are to contact one another or to be converged, respectively, the control unit 9 for the horizontal movement B1 from the preliminary position PS1 to the connecting position P2 specifies to the processing station a first velocity V1, and for the vertical movement B2 from the preliminary position PW1 to the connecting position P2 a second velocity V2, at which the movements B1, B2 are subsequently carried out.

Examples of different defined parameters for the velocity V1 of the movement B1 of the clamping jig 3 and the velocity V2 of the movement B2 of the workpiece holder 4 and resultant added overall motion sequences BA which lead to different connection angles are shown in FIG. 3a to FIG. 3e. It is assumed here that the displacement distances for the movement from the respective preliminary position PS1, PW1 to the connecting position P2 are essentially identical. The horizontal movement B1 in FIG. 3a to FIG. 3e is also referred to as the Y-movement and is illustrated as horizontal vector, while the vertical movement B2 is also referred to as the Z-movement and illustrated as a vertical vector. The overall motion sequence BA is also referred to as the "resultant movement". $v_Y$ is also used for the velocity V1, and $v_Z$ is also used for the velocity V2.

Figure 3A:
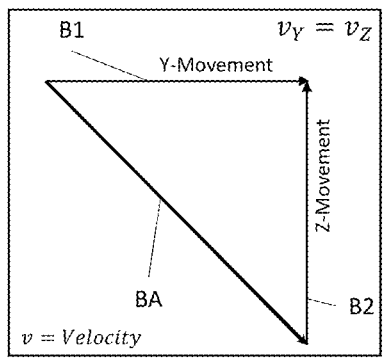
FIG. 3a to FIG. 3e show embodiments for defining a first velocity and a second velocity for moving the first component and the second component to the connecting position.
Figure 3B:
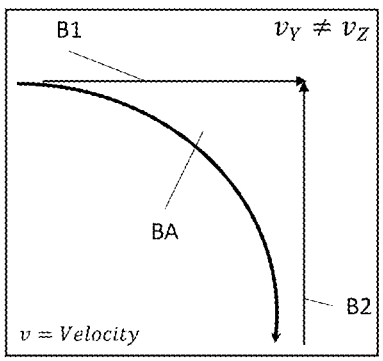
Figure 3C:
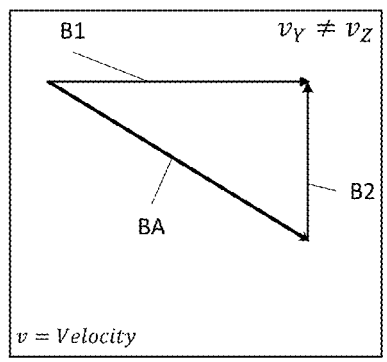
Figure 3D:
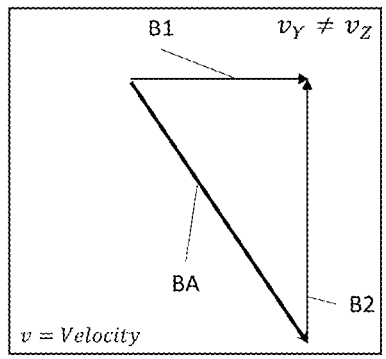
Figure 3E:
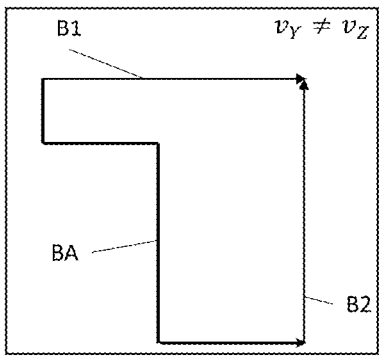

It applies to FIG. 3a that the velocity V1 of the movement B1 is equal to the velocity V2 of the movement B2. In FIG. 3b to FIG. 3e the velocity V1 is in each case unequal to the velocity V2. In FIG. 3b the velocity V1 is lower than the velocity V2, whereby the velocities V1, V2 are not constant. In FIG. 3c, the velocities V1, V2 are substantially constant, whereby the velocity V1 is lower than the velocity V2. In FIG. 3d, the velocities V1, V2 are substantially constant, whereby the velocity V1 is higher than the velocity V2. In FIG. 3e, the movements B1, B2 are stopped in the interim.

Figure 5A:
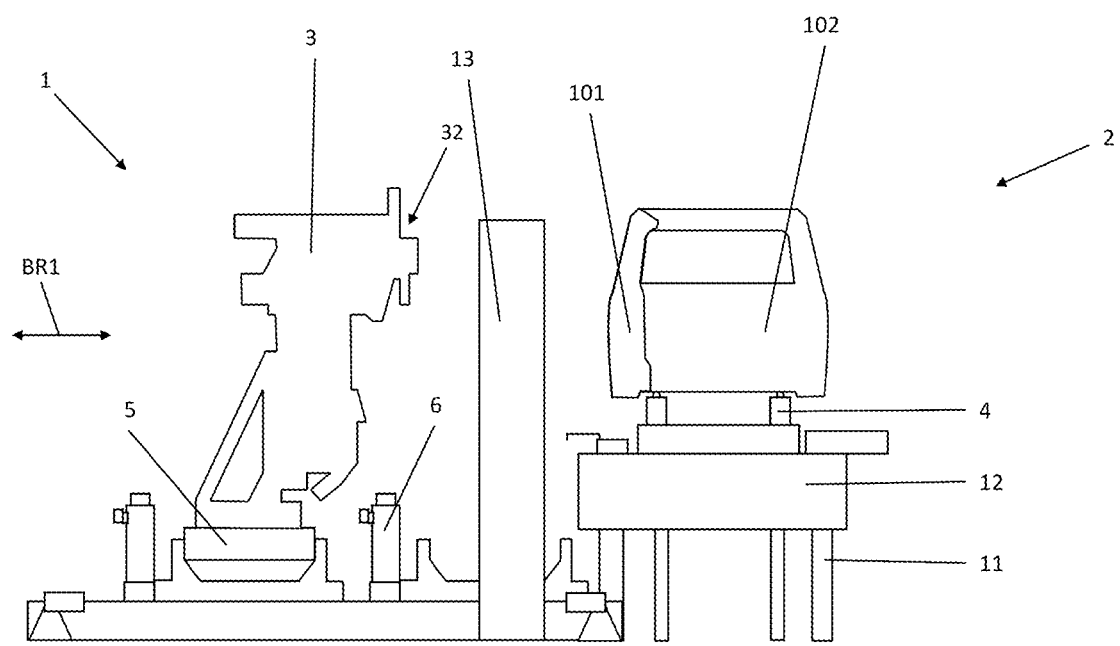
FIG. 5a shows a processing station known in the prior art in a preliminary position.
Figure 5B:
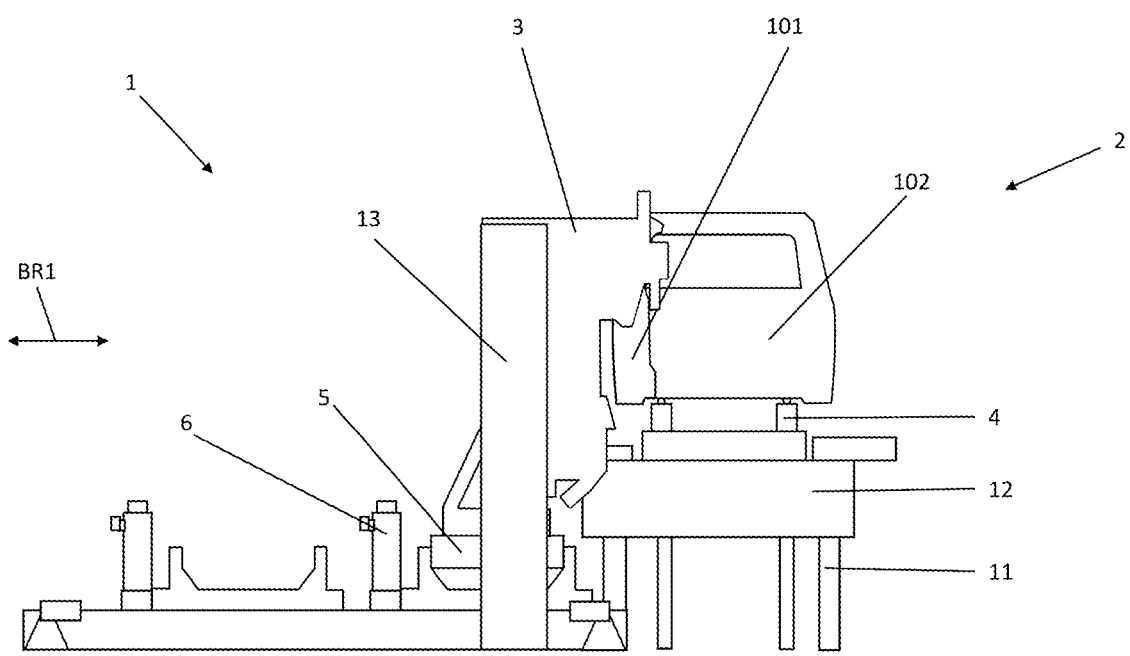
FIG. 5b shows a clamping jig having a pivotable clamping group in a processing station known in the prior art.
Figure 5C:
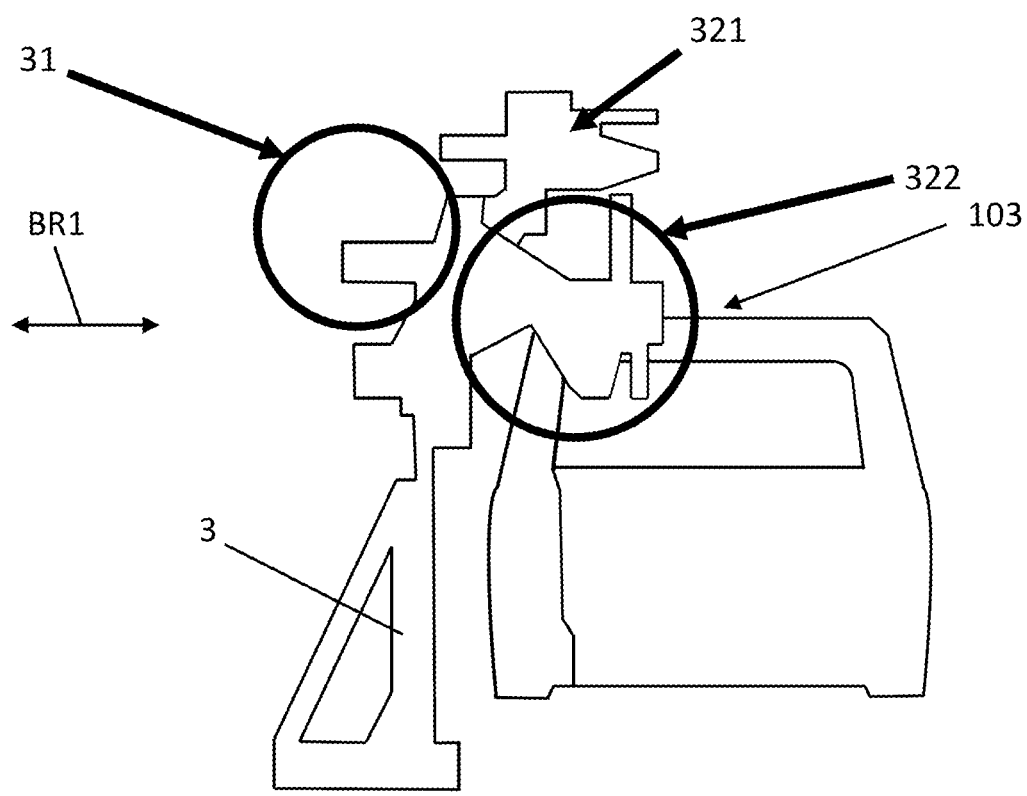
FIG. 5c shows a clamping jig having a pivotable clamping group in a processing station known in the prior art.

Illustrated in FIG. 5a is a further processing station 1 known in the prior art, having a geometry clamping station 2 and a clamping jig 3 which is displaceable in the horizontal direction BR1 and has a clamping group 32. A side panel 101 as the first component is attached to a body 102 as the second component by clips, before the construction elements 101, 102 are moved into the geometry clamping station 2. In the process, the body having a skid as the workpiece holder 4 travels across a roller track 12 with an elevation 11 into the geometry clamping station 2. The clamping jig 3 is then displaced in the horizontal direction BR1 to the geometry clamping station 2 and on the latter braced on both sides on the fixing element 13, as is shown in FIG. 5b. The clamping jig 3 then clamps the body 102 and the side panel 101 in a connecting position, and a welding process for connecting the side panel 101 to the body 102 commences. It is problematic here inter alia that the clamping jig 3 having the clamping group 32 for bracing the components 101, 102 cannot be displaced directly to the connecting position, as shown in FIG. 5c. In this way, the clamping group 32 shown by way of example there for clamping a roof rail component assembly 103 cannot simply be displaced in the horizontal direction (Y-direction) because the latter may otherwise collide with parts of the body. In order for this to be avoided, the clamping jig 3 comprises a pivoting unit 31 by way of which the clamping group 32 can be pivoted. FIG. 5c for illustrative purposes shows the opened clamping group 321 by way of which the clamping jig 3 is moved right up to the component assembly 103, and the clamping group 322 which is pivoted inwards into the working position and in which the component assembly 103 can be braced and subsequently welded.

A method and a processing station which are suitable for bracing and joining the above-described component assembly 103, without having a pivotable clamping group and without a pivoting unit, will be explained in more detail with reference to FIG. 6a to FIG. 6c.

Figure 6A:
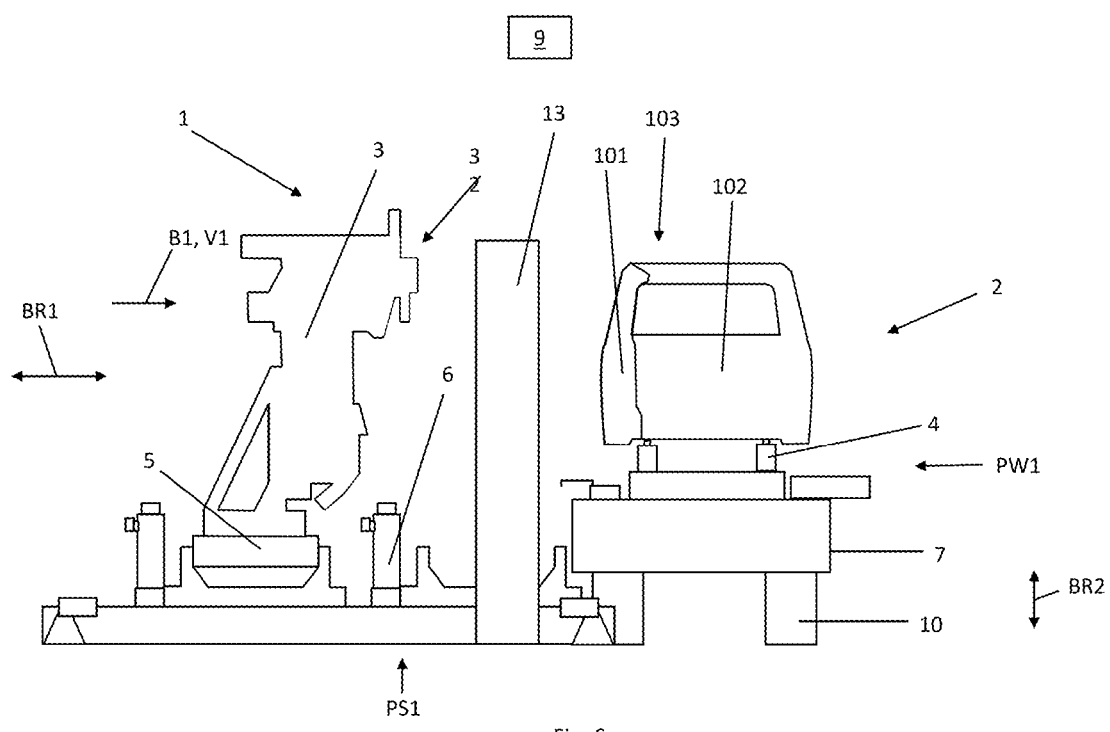
FIG. 6a in a simplified lateral view shows a further exemplary embodiment of a processing station configured according to the disclosure in a preliminary position.

FIG. 6a shows an exemplary embodiment of a processing station 1 configured according to the disclosure for joining a first component 101 to a second component 102, wherein in this exemplary embodiment the first component 101 is a side panel as the body component, and the second component 102 is a body. The second component 102 and the first component 101 to which the second component 102 for a provisional disposal is attached by clips, here form a component assembly 103 that is to be connected by joining.

The processing station 1 comprises a geometry clamping station 2, also referred to as a geobox, and a clamping jig 3 having a non-pivotable clamping group 32. The clamping jig 3 is disposed on a mobile support unit 5. The support unit 5 and thus also the clamping jig 3 by means of the first drive unit 6, the latter here comprising in particular an electric motor, are displaceable in a horizontal direction as the first direction of movement BR1. The drive unit 6 here is controlled by an electronic control unit 9 of the processing station 1. Shown in FIG. 6a is the processing station 1 in which the clamping jig 3, or the clamping group 32, respectively, is situated in a preliminary position PS1.

While only one clamping jig 3 is illustrated to the left of the geometry clamping station 2 in FIG. 6a, a further clamping jig can be provided to the right of the geometry clamping station 2, in particular for attaching side panels to a body, whereby the further clamping jig is advantageously controlled in the same way as the clamping jig 3 so that both clamping jigs advantageously carry out the same method steps, in particular in a synchronous manner.

The geometry clamping station 2 of the processing station 1 comprises a receptacle unit 7 which in this exemplary embodiment is configured as a section of a roller track. The receptacle unit 7 of the geometry clamping station 2 is configured to receive a workpiece holder 4 that supports a component assembly 103, wherein the workpiece holder 4 in this exemplary embodiment is a skid. The body 102 as the second component in this exemplary embodiment is disposed on the workpiece holder 4, and the first component 101, i.e. the side panel, is attached to the body 102 by clips. The component assembly 103 thus formed is then moved into the geometry clamping station 2 by way of the roller track system, wherein the workpiece holder 4 is received by the receptacle unit 7. The receptacle unit 7 here is disposed on a lifting unit 10 that comprises a second drive unit. By means of this lifting unit 10, which is assigned to the receptacle unit 7, the receptacle unit 7 can be moved in a vertical direction as the second direction of movement BR2. The second drive unit, or the lifting unit 10, respectively, is likewise controlled by means of the control unit 9 of the processing station 1.

In FIG. 6a, the workpiece holder 4 is lowered by means of the lifting unit 10 and moved to a preliminary position PW1. It may be the case that for incorporating the workpiece holder 4 the receptacle unit 7 is initially disposed in a deviating position and the receptacle unit 7 by means of the lifting unit 10 is displaced to the preliminary position PW1 only with the incorporated workpiece holder 4. This is suitably controlled by the control unit 9. The control unit 9 is moreover configured to control the first drive unit 6 and the lifting unit 10 having the second drive unit in such a manner that the component assembly received by the clamping jig 3 having the clamping group 32 and received by the receptacle unit 7 by way of the workpiece holder 4 are moved simultaneously to a connecting position P2. The side panel 101 is then connected to the body 102 by joining in the connecting position P2.

To this end, the clamping jig 3 having the clamping group 32, proceeding from the preliminary position PS1 shown in FIG. 6a, in a movement B1 in the horizontal direction BR1 is displaced at a velocity V1 to the geometry clamping station 2, to the connecting position P2. The movement B1 here takes place simultaneously with the moving of the workpiece holder 4 by way of the motion sequence defined for the workpiece holder 4. Proceeding from the preliminary position PS1, or the preliminary position PW1, respectively, the clamping jig 3 having the clamping group 32 in a horizontal movement B1, and the workpiece holder 4 having the component assembly 103 in a vertical movement B2, are moved simultaneously in each case at a definable angle VA and/or a definable motion sequence BA to the connecting position P2. A plane which is parallel to the floor on which the processing station 1 is set up can be provided in particular as the reference plane for the angle VA herein.

Figure 6B:
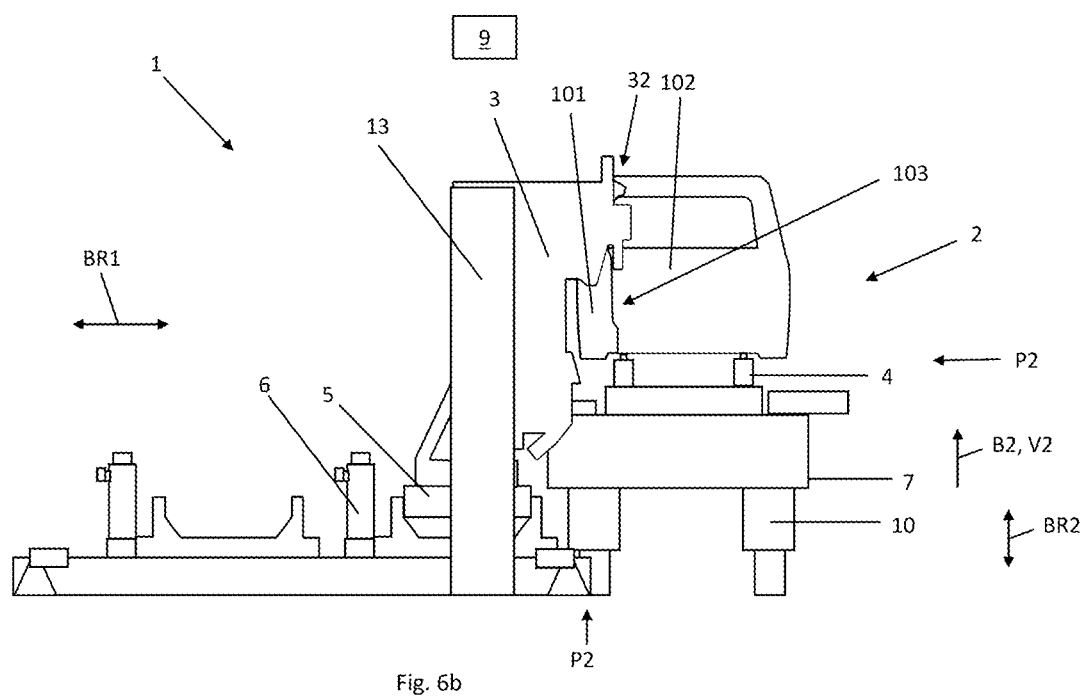
FIG. 6b in a simplified lateral view shows the processing station according to FIG. 6a in a connecting position.

FIG. 6b shows the clamping jig 3 and the clamping group 32 and the workpiece holder 4, and the component assembly 103, respectively, in the connecting position P2. The clamping jig 3 in the connecting position P2 is fixed to a fixing element 13 of the geometry clamping station 2. To this end, the fixing element 13 comprises in particular a plurality of tension clamps, detents and/or further fixing means for fixing the clamping jig 3, which are not explicitly shown in the figures. The component assembly 103 is then braced by means of the clamping group 32. The side panel 101 and the body 102 are then connected to one another by joining, in particular welded to one another, in the connecting position P2.

Figure 6C:
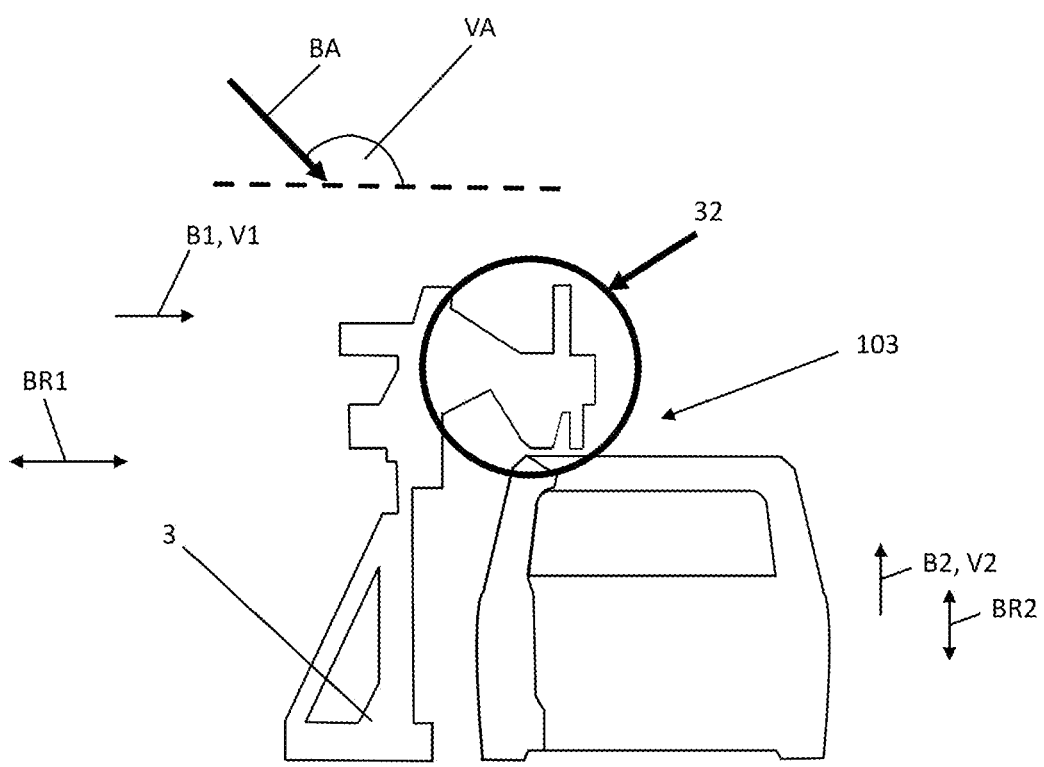

Illustrated by way of example in FIG. 6c is a motion sequence BA which results from the movement B1 of the clamping jig 3 and from a movement B2 of the workpiece holder 4, and a resultant angle VA at which the clamping group 32 and the component assembly 103 are converged. The workpiece holder 4 per se is not illustrated in FIG. 6c. As a result thereof, the clamping group 32 and the component assembly 103 can advantageously be converged without having to pivot the clamping group 32. As result of the possibility of moving the clamping jig 3 and the component assembly 103 disposed on the workpiece holder, the expensive and heavy pivoting unit as shown in FIG. 5c can advantageously be dispensed with.

In order to attain a defined angle VA at which the clamping group 32 and the component assembly 103 are to be converged, the control unit 9 specifies to the processing station 1 for the horizontal movement B1 from the preliminary position PS1 to the connecting position P2 a first velocity V1, and for the vertical movement B2 from the preliminary position PW1 to the connecting position P2 a second velocity V2, at which the movements B1, B2 are then carried out simultaneously.

Examples of different defined parameters for the velocity V1 of the movement B1 of the clamping jig 3 and for the velocity V2 of the movement B2 of the workpiece holder 4 and resultant added overall motion sequences BA which lead in particular to different angles VA are shown in FIG. 7a to FIG. 7e. It is assumed here that the displacement distances for the moving from the respective preliminary position PS1, PW1 to the connecting position P2 are essentially identical. The horizontal movement B1 in FIG. 7a to FIG. 7e is also referred to as the Y-movement and illustrated as a horizontal vector, while the vertical movement B2 is also referred to as the Z-movement and illustrated as a vertical vector. The overall motion sequence BA is also referred to as the "resultant movement". $v_Y$ is also used for the velocity V1, and $v_Z$ is also used for the velocity V2.

Figure 7A:
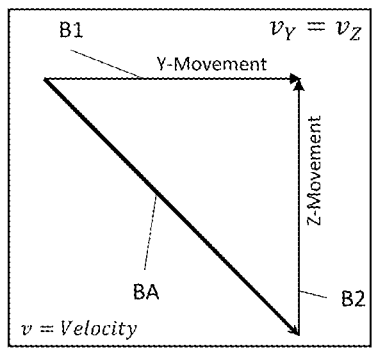
FIG. 7a to FIG. 7e show exemplary embodiments for defining a first velocity and a second velocity for moving the clamping jig and the component assembly to the connecting position.
Figure 7B:
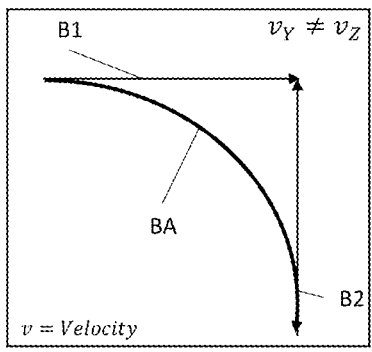
Figure 7C:
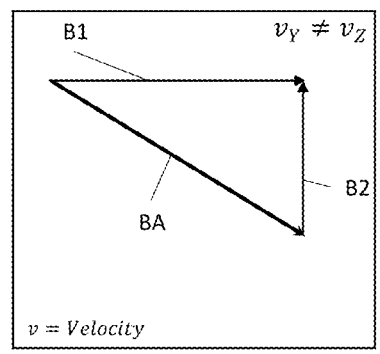
Figure 7D:
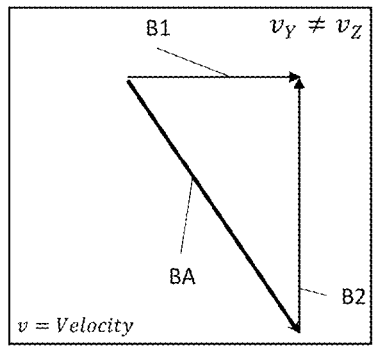
Figure 7E:
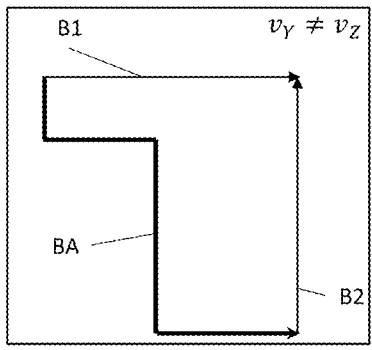

It applies to FIG. 7a that the velocity V1 of the movement B1 is equal to the velocity V2 of the movement B2. In FIGS. 7b to 7e, the velocity V1 is in each case unequal to the velocity V2. In FIG. 7b, the velocity V1 is lower than the velocity V2, whereby the velocities V1, V2 are not constant. In FIG. 7c, the velocities V1, V2 are substantially constant, whereby the velocity V1 is lower than the velocity V2. In FIG. 7d, the velocities V1, V2 are substantially constant, whereby the velocity V1 is higher than the velocity V2. In FIG. 7e, the movements B1, B2 stopped in the interim.

The exemplary embodiments illustrated in the figures and explained in the context of the latter are intended to explain the disclosure and do not limit the latter.

LIST OF REFERENCE SIGNS

1 Processing station
2 Geometry clamping station
3 Clamping jig
31 Pivoting unit
32 Clamping group
321 Clamping group opened
322 Clamping group pivoted inwards
4 Workpiece holder
Support unit
6 First drive unit
7 Receptacle unit
9 Control unit
Lifting unit
11 Elevation
12 Roller track
13 Fixing element
101 First component
102 Second component
103 Component assembly
110 Connecting face of the first component (101)
111 Undercut of the first component (101)
B0 Movement in the preliminary position
B1 First movement
B2 Second movement
BA Resultant overall motion sequence
BR1 First direction of movement
BR2 Second direction of movement
PS0 Receiving position of the clamping jig (3)
PS1 Preliminary position of the clamping jig (3)
P2 Connecting position
PW1 Preliminary position of the workpiece holder (4)
V1 First velocity
V2 Second velocity
VA Connection angle

The invention claimed is:

1. A processing station for connecting a first component of a vehicle body to a second component of a vehicle body, the processing station comprising:
a geometry clamping station and a clamping jig, wherein the clamping jig is disposed on a mobile support unit which by means of a first drive unit can be moved horizontally, and wherein the geometry clamping station includes a receptacle unit configured to receive a workpiece holder, wherein the receptacle unit is assigned a second drive unit by way of which the receptacle unit can be moved in vertically, and the processing station is assigned a control unit configured to control the first drive unit and the second drive unit in such a manner that the clamping jig and the workpiece holder are moved to a connecting position in which the first component can be connected to the second component;
wherein the clamping jig of the processing station is configured to receive the first component, and the geometry clamping station is configured to receive the workpiece holder that supports the second component, wherein the control unit is configured to control the first drive unit and the second drive unit in such a manner that, simultaneously, the first component received by the clamping jig is moved horizontally at a horizontal movement speed by the first drive unit and the second component received by the receptacle unit by way of the workpiece holder is moved vertically at a vertical movement speed by the second drive unit, wherein the horizontal movement speed and the vertical movement speed are such that the first and second components are simultaneously moved toward one another and attain the connecting position at a defined angle that is neither horizontal nor vertical and that is based on geometries of the first and second components.

2. The processing station of claim 1, wherein the second component and the first component, the latter being provisionally disposed on the second component, form a component assembly, the clamping jig comprises a clamping group, the processing station furthermore comprises a fixing element for fixing the clamping jig in the connecting position, and the geometry clamping station comprises a receptacle unit which is configured to receive the workpiece holder that supports the component assembly, wherein the control unit is furthermore configured to control the first drive unit and the second drive unit in such a manner that the clamping group of the clamping jig and the component assembly received by the receptacle unit by way of the workpiece holder are moved to the connecting position in which the first component can be joined to the second component.

3. A processing station for connecting a first component of a vehicle body to a second component of a vehicle body, the processing station comprising:
 a component arrangement formed by the second component and the first component, which is provisionally arranged on the second component, the component arrangement comprising a geometry clamping station, a frame with a clamping group and a fixing element for fixing the frame in a connection position;
 a movably designed support unit, wherein the frame is arranged on the movably designed support unit, which is configured to be moved in a first direction of movement (BR1) by a first drive unit; and
 a receiving unit provided by the geometry clamping station, the receiving unit configured to receive a workpiece carrier carrying the component arrangement;
 wherein a second drive unit is assigned to the receiving unit, with which the receiving unit is configured to be moved in a second direction of movement (BR2), the first direction of movement (BR1) and the second direction of movement (BR2) being non-parallel, and the processing station is assigned a control unit which is configured to control the first drive unit and the second drive unit such that the clamping group of the frame and the component arrangement received by the receiving unit via a workpiece carrier are moved simultaneously into a joining position (P2) in which the first component is joined to the second component.

* * * * *